United States Patent Office 3,148,509
Patented Sept. 15, 1964

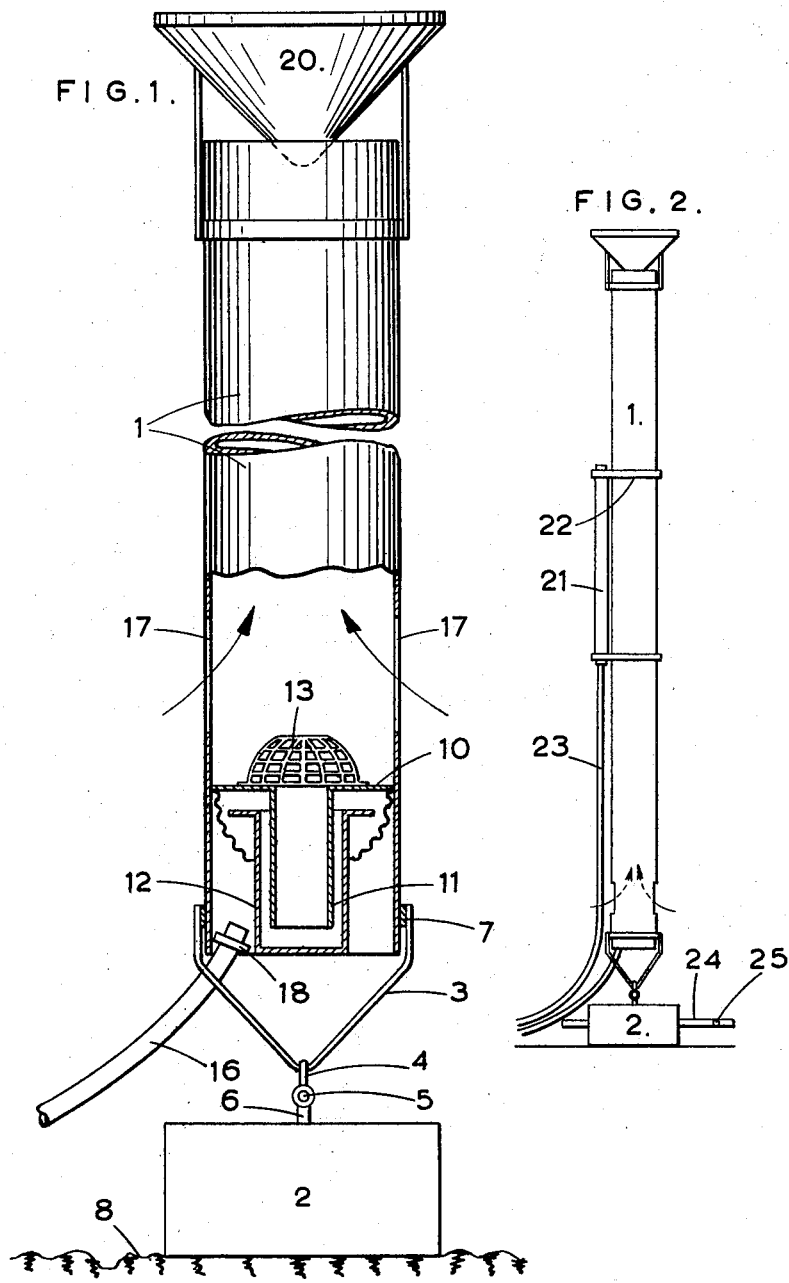

3,148,509
WAVE REDUCTION, DE-ICING AND
DESTRATIFICATION APPARATUS
Alec Hibburd Laurie, London, England, assignor to Pneumatic Breakwaters Limited, London, England, a body corporate of Great Britain
Filed Oct. 24, 1960, Ser. No. 64,582
4 Claims. (Cl. 61—6)

This invention relates to methods of and apparatus for reducing sea waves and swell, or destratifying liquid, or de-icing or inhibiting the formation of ice on bodies of water.

In our co-pending application Serial No. 671,642, now Patent No. 2,967,399, there is described apparatus for reducing sea waves by generating turbulence in the ambient water. The method employed consists in the intermittent emission of large bubbles of air or other gas from apparatus located at the sea bed, the said large bubbles rising through the water and creating substantial eddies and turbulence during their ascent to the surface. An embodiment of suitable apparatus for producing large intermittent bubbles is described, in which the air or gas is fed continuously into a storage chamber until a predetermined volume of stored gas is reached whereupon a siphon action takes place resulting in the discharge of the stored gas content in the form of a large bubble.

In the present invention the wave-reducing properties of turbulence in water are enhanced by being concentrated into the upper layers of the water, in which the wave action is greatest. Not only are the large bubbles, previously emitted at the sea bed, prevented from immediately generating turbulence, but the work which would have been done to small effect in the lower layers of the water is stored up and released into the upper layers of the water at such a depth below the surface as is appropriate to the wave conditions at a specific site.

Apparatus according to the invention comprises a distributor which may be of the form described in the aforementioned specification, located at the base of a tube or conduit of large diameter, e.g. 12", in such manner that the bubbles emitted by the distributor when fed with compressed air or gas, pass into and up the tube, which is ported or otherwise apertured to enable water or liquid to be entrained by the bubbles and lifted during their ascent up the tube, so transmitting the water or liquid from the lower levels to the level at or about which the head of the pipe is situate.

The apparatus is thus suitable for destratifying reservoirs and other bodies of liquid or for de-icing, or inhibiting the formation of ice on water masses since water from a lower warmer stratum may be brought to the vicinity of the surface and distributed thereabout by the turbulence caused as the bubbles ascend and burst.

In a specific embodiment of apparatus intended more particularly for reducing sea waves and swell the riser tube or conduit is of plastic suitably polythene some 12 inches diameter and about 20 ft. long, the length depending on the site. Polythene is itself buoyant, although additional buoyancy means may be provided.

The lower end of the tube is anchored, preferably pivotally to a weight or sinker intended to rest or be embedded in the sea bottom.

A plurality of these sinkers with their flexibly mounted riser tubes or bubble-guns, each incorporating a distributor at its lower end, are arranged conveniently in line on the sea bed at intervals of about 5 feet, the sinkers being flexibly connected to each other by angle iron embedded in the concrete, succeeding angle irons being bridged by flexible joints providing an articulated connection.

Air lines connect the distributors to a common source of compressed air or gas.

By utilizing at the foot of the conduit, a distributor or ejector which intermittently releases large bubbles of substantially the diameter of the bore of the conduit, the maximum volume of liquid is entrained and lifted during the ascent of the bubbles to the head of the conduit situate below the surface of the liquid.

Furthermore, bubbles of such diameter ascending do not generate detached eddies in the liquid rising in the conduit, and consequently there is considerably less frictional loss than would be the case if a plurality of small bubbles were released and the mechanical efficiency of the device is thereby correspondingly improved.

The invention will be further described with reference to the accompanying drawings where one embodiment is illustrated by way of example and in which drawings FIGURE 1 is a side elevation partly in section and FIGURE 2 is a side elevation to a smaller scale of a similar device equipped with a self emptying float.

Referring now to the drawings, 1 represents a tube or bubble-gun, suitably of polythene, 12 inches diameter and 20 feet long, open at both ends and having its lower end flexibly connected to a concrete sinker 2 by a bridle 3 which passes through an eye 4 pivoted at 5 on a metal bracket 6 cast into the sinker 2.

The bridle 3 depends from a metal ring 7 encircling the tube 1. 8 represents the sea bed.

In this embodiment 10 generally designates a distributor or ejector according to our co-pending application Serial No. 671,642 at the bottom end of the tube 1, such distributor having an inner depending tube 11 and a concentric siphon tube 12, the distributor being furnished with a protective grid or grill 13. As is obvious, tubes 11 and 12 delineate an inverted siphon, tube 11 defining one leg communicating along its bottom edge to the other leg of the siphon delineated by the confronting faces of tubes 11 and 12. As gas trapping or storage chamber is delineated by the outer wall of generator 10 and the wall of tube 11 above the lower edge of said tube 11.

16 is an air line from a suitable source of compressed air (not shown) opening into the annular space surrounding the siphon tube 12 at the bottom of the bubble-gun tube 1, and 17 are large ports in the wall of such tube immediately above the distributor 10.

The mouth of the air line 16 is secured by a clip 18 to the inner wall of the tube 1.

20 is an inverted buoyant cone optionally mounted at the top of the gun tube 1, and 21 in FIGURE 2 is a buoyancy tube optionally attached by straps 22 to the gun tube 1 and having a separate air line 23 to the source of compressed air.

24 in this figure represent angle irons cast into the concrete sinker 2, the angle irons of one sinker being adapted to be connected to those of the next by flexible joints 25 which allow articulation and enable the sinkers to accommodate themselves to surface inequalities on the sea bed.

It will be appreciated that portions of the air lines 16 and 23 may be embedded in the sinkers, the lines being positioned between parallel connecting members 24.

In operation, large bubbles of an appropriate size in relation to the diameter of the conduit and that closely fit its bore, are intermittently ejected by the siphon distributor 10. The volume of these bubbles correspond to the volume of the gas trapping chamber as defined above. Taking the progress of a single large bubble by stages, the large bubble is discharged from the distributor 10 and rises in the tube 1 and, in so doing, takes on the properties of a piston. The bubble rises past the windows or ports 17 and proceeds upwards, pushing water ahead of itself, and entraining further water through the ports in its rear. Such water, impelled by the bubble is discharged at high velocity through the upper open end of the tube past the inverted cone 20. The discharge water behaves as a jet of a fluid in the same medium and according to established physical laws, entrains further water in the process of forming a conical jet stream. The process is accompanied by a rapid transference of the original kinetic energy of the jet into energy of turbulent flow and as a result of this turbulence in the ambient water the amplitude of waves is reduced.

The large bubbles aforesaid, on leaving the top end of the tube add to the existing turbulence by their action on the ambient water during the remainder of their flight to the water surface.

The air supply to the distributor 10 is regulated so that there is always at least one large bubble in transit up the tube, and by this means a steady discharge of water at the top of the tube is secured.

By the present invention an improved method of generating turbulence in a chosen layer of water, at or near the surface, for the purpose of reducing the height of surface waves is obtained. There is also provided a method of entraining water from the bottom of a body of water and of discharging it in a highly turbulent state at or near the surface, for the purpose of breaking down conditions of stratification which lead, in cold climates, to ice formation at the surface, and in temperate and warm climates to a stratification or layering of impounded bodies of water. The generation of turbulence, in addition to the actual transfer of water from the bottom upwards, is an essential feature in such utilisations since the transference upwards of water of greater density into a region of less density would be of little avail without the thorough mixing of the lower and upper waters to ensure a homogeneous fluid, and to prevent the heavier water from falling back to the bottom again.

I claim:

1. A liquid circulating apparatus for moving a liquid upward in a body of said liquid comprising a conduit adapted to be submerged in said body of liquid below the surface thereof, said conduit providing a substantially vertical passageway having a lower liquid intake opening and an upper liquid discharge opening, and an intermittent gas bubble generator having an upwardly directed bubble discharge port registering with said passageway and disposed below said discharge opening, said generator including a gas trapping chamber having a lower inlet opening formed therein below the top of said chamber, means connecting said gas trapping chamber to a source of gas under pressure and an inverted siphon connecting said gas trapping chamber and said bubble discharge port and having an upper inlet opening communicating with said gas trapping chamber above the level of said chamber inlet opening, said siphon including a lower elbow passage with an upper level disposed above the level of said chamber inlet opening whereby the volume of said trapping chamber between the lower level of said siphon and the level of said inlet opening is of sufficient capacity to form a bubble of a transverse cross-section not substantially less than that of said conduit.

2. A liquid circulating apparatus for moving a liquid upwardly in a body of said liquid comprising a conduit adapted to be submerged in said body of liquid below the surface thereof, said conduit providing a substantially vertical passageway having a lower liquid intake opening and an upper liquid discharge opening, and an intermittent gas bubble generator having an upwardly directed bubble discharge port registering with said passageway and disposed below said discharge opening, said generator including an inner tube having a top opening defining said discharge port and a bottom opening, a siphon tube concentric with said inner tube and having a top opening and an inside diameter greater than the outside diameter of said inner tube and extending below said inner tube bottom opening, a wall closing the bottom end of said siphon tube, an outer wall surrounding and transversely spaced from said siphon tube and projecting below the bottom of said inner tube, a top wall disposed above said siphon tube top opening and connecting said outer wall and said inner tube and delineating therewith a gas trapping chamber having a capacity above the level of said inner tube bottom opening sufficient to form a bubble of a transverse cross-section not substantially less than said conduit and having a bottom opening below the bottom of said inner tube, and means for connecting said gas trapping chamber to a source of gas under pressure.

3. A liquid circulating apparatus for moving a liquid upward in a body of said liquid comprising a conduit adapted to be submerged in said body of liquid below the surface thereof, said conduit providing a substantially vertical passageway having a lower liquid intake opening formed in said conduit above the bottom thereof and an upper liquid discharge opening, and an intermittent gas bubble generator having an upwardly directed bubble discharge port registering with said passageway and disposed below said discharge opening, said generator including an inner tube disposed in said conduit below said liquid intake opening and having a top opening defining said discharge port and a bottom opening located above the bottom edge of said conduit, a siphon tube disposed between said inner tube and said conduit, and having a top opening disposed below said inner tube top opening and a closed bottom below said inner tube bottom opening, a top wall disposed above said siphon tube and extending from the upper edge of said inner tube outwardly to said conduit and delineating with said inner tube and the wall of said conduit a gas trapping chamber having a capacity above the level of said inner tube bottom opening sufficient to form a bubble of a transverse cross-section not substantially less than said conduit and having an open bottom below the bottom of said inner tube, and means for connecting said gas trapping chamber to a source of gas under pressure.

4. The apparatus of claim 3, wherein said connecting means includes a tube having an outlet opening registering with said chamber open bottom.

References Cited in the file of this patent

UNITED STATES PATENTS

| | | |
|---|---|---|
| 2,417,519 | Persson | Mar. 18, 1947 |
| 2,748,075 | Hovlid | May 29, 1956 |
| 2,827,268 | Staaf | Mar. 18, 1958 |
| 2,967,399 | Laurie | Jan. 10, 1961 |
| 3,032,496 | Griffith | May 1, 1962 |

FOREIGN PATENTS

| | | |
|---|---|---|
| 805,789 | Great Britain | Dec. 10, 1958 |